(12) United States Patent
    Sudbrink et al.

(10) Patent No.: US 9,521,800 B2
(45) Date of Patent: Dec. 20, 2016

(54) TRIPLE-FOLD TILLAGE IMPLEMENT WITH TRANSPORT READY FRONTAL PROFILE

(71) Applicant: CNH Industrial America LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/520,602

(22) Filed: Oct. 22, 2014

(65) Prior Publication Data

US 2015/0129249 A1    May 14, 2015

(51) Int. Cl.
    *A01B 73/04*    (2006.01)
(52) U.S. Cl.
    CPC ........... *A01B 73/044* (2013.01); *A01B 73/046* (2013.01)
(58) Field of Classification Search
    CPC ......... A01B 73/00; A01B 73/02; A01B 73/04; A01B 73/044; A01B 73/046
    See application file for complete search history.

(56) References Cited

U.S. PATENT DOCUMENTS

| | | | | |
|---|---|---|---|---|
| 4,133,391 A * | 1/1979 | Richardson | .......... | A01B 73/046 172/1 |
| 4,191,260 A * | 3/1980 | Klindworth | .......... | A01B 73/046 16/370 |
| 4,249,616 A * | 2/1981 | Moe | ...................... | A01B 73/044 172/311 |
| 4,355,689 A * | 10/1982 | Friggstad | ............. | A01B 73/046 172/311 |
| 6,089,329 A * | 7/2000 | Smith | ................... | A01B 73/046 172/452 |
| 7,497,269 B2 * | 3/2009 | Jagow | ................... | A01B 73/046 172/311 |
| 8,122,970 B2 * | 2/2012 | Palen | .................... | A01B 73/046 172/311 |
| 8,505,645 B1 * | 8/2013 | Kelly | .................... | A01B 73/046 172/311 |
| 8,776,908 B2 * | 7/2014 | Maro | .................... | A01B 73/046 172/311 |
| 8,893,816 B2 * | 11/2014 | Maro | .................... | A01B 73/046 172/311 |
| 2002/0043378 A1 * | 4/2002 | Hundeby | ............. | A01B 73/046 172/239 |

(Continued)

*Primary Examiner* — Matthew D Troutman
(74) *Attorney, Agent, or Firm* — Rebecca L. Henkel

(57) ABSTRACT

An agricultural tillage implement includes a center frame section having a pull hitch configured to be towed, and a plurality of wing sections positioned on opposite lateral sides of the center frame section. The plurality of wing sections include an inner wing section, a middle wing section and an outer wing section. Each outer wing section is configured to fold laterally inward and over a respective middle wing section. Each middle wing section is configured to fold laterally inward and over a respective inner wing section. Each inner wing section is configured to fold laterally inward and over the center frame section, whereby each of the plurality of wing sections when in a folded state are in a transport position with an overall frontal profile having dimensions of no greater than approximately 18 feet wide by 13 feet, 6 inches high.

18 Claims, 8 Drawing Sheets

(56) References Cited

U.S. PATENT DOCUMENTS

| | | | |
|---|---|---|---|
| 2007/0079976 A1* | 4/2007 | Jagow | A01B 73/046 172/311 |
| 2012/0247378 A1* | 10/2012 | Knobloch | A01C 23/023 111/120 |
| 2014/0060035 A1* | 3/2014 | Barfels | F15B 1/024 60/484 |
| 2014/0060860 A1* | 3/2014 | Maro | A01B 73/046 172/1 |
| 2014/0060865 A1* | 3/2014 | Maro | A01B 73/046 172/311 |

* cited by examiner

TRIPLE-FOLD TILLAGE IMPLEMENT WITH TRANSPORT READY FRONTAL PROFILE

CROSS REFERENCE TO RELATED APPLICATIONS

This is a non-provisional application based upon U.S. provisional patent application Ser. No. 61/903,501, entitled "TRIPLE-FOLD TILLAGE IMPLEMENT WITH TRANSPORT READY FRONTAL PROFILE", filed Nov. 13, 2013, which is incorporated herein by reference.

BACKGROUND OF THE INVENTION

1. Field of the Invention

The present invention relates to agricultural tillage implements, and, more particularly, to agricultural field cultivators.

2. Description of the Related Art

Farmers utilize a wide variety of tillage implements to prepare soil for planting. Some such implements may include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling (aka. crumbler) basket, etc., or any combination thereof.

As tillage implements become wider and wider over time, it becomes more difficult to convert the tillage implement from an operating mode to a transport mode, or vice versa, without requiring too much time and difficulty on the part of the operator. It is desirable for the tillage implement to be converted from one mode to the other while the operator remains within the operator cab, through the use of hydraulics or other actuators. It is also desirable for the tillage implement to remain within certain geometric constraints so that it is not necessary to use a separate "escort vehicle" or the like when traveling on public roads.

What is needed in the art is a field cultivator which can have a triple-fold configuration with a wide operating width, e.g., greater than 50 feet, while still being folded compactly and remotely to a transport position which complies with regulatory highway requirements.

SUMMARY OF THE INVENTION

The present invention provides a triple-fold field cultivator which is capable of being folded into a transport position with an overall frontal profile which meets regulatory highway requirements.

The invention in one form is directed to an agricultural tillage implement, including a center frame section having a pull hitch configured to be towed, and a plurality of wing sections positioned on opposite lateral sides of the center frame section. The plurality of wing sections include an inner wing section, a middle wing section and an outer wing section. Each outer wing section is configured to fold laterally inward and over a respective middle wing section. Each middle wing section is configured to fold laterally inward and over a respective inner wing section. Each inner wing section is configured to fold laterally inward and over the center frame section, whereby each of the plurality of wing sections when in a folded state are in a transport position with an overall frontal profile having dimensions of no greater than approximately 20 feet wide by 14 feet high, preferably no greater than approximately 18 feet wide by 13 feet, 6 inches high.

The invention in another form is directed to a method of folding a multi-section field cultivator from an operating position to a transport position. The field cultivator includes a center frame section having a pull hitch and a plurality of wing sections positioned on opposite lateral sides of the center frame section. The method includes the steps of:

providing the plurality of wing sections with an inner wing section, a middle wing section and an outer wing section;

folding each outer wing section laterally inward and over a respective middle wing section;

folding each middle wing section laterally inward and over a respective inner wing section, and folding each inner wing section laterally inward and over the center frame section, whereby each of the plurality of wing sections when in a folded state are in a transport position with an overall frontal profile having dimensions of no greater than approximately 20 feet wide by 14 feet high, preferably no greater than approximately 18 feet wide by 13 feet, 6 inches high.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
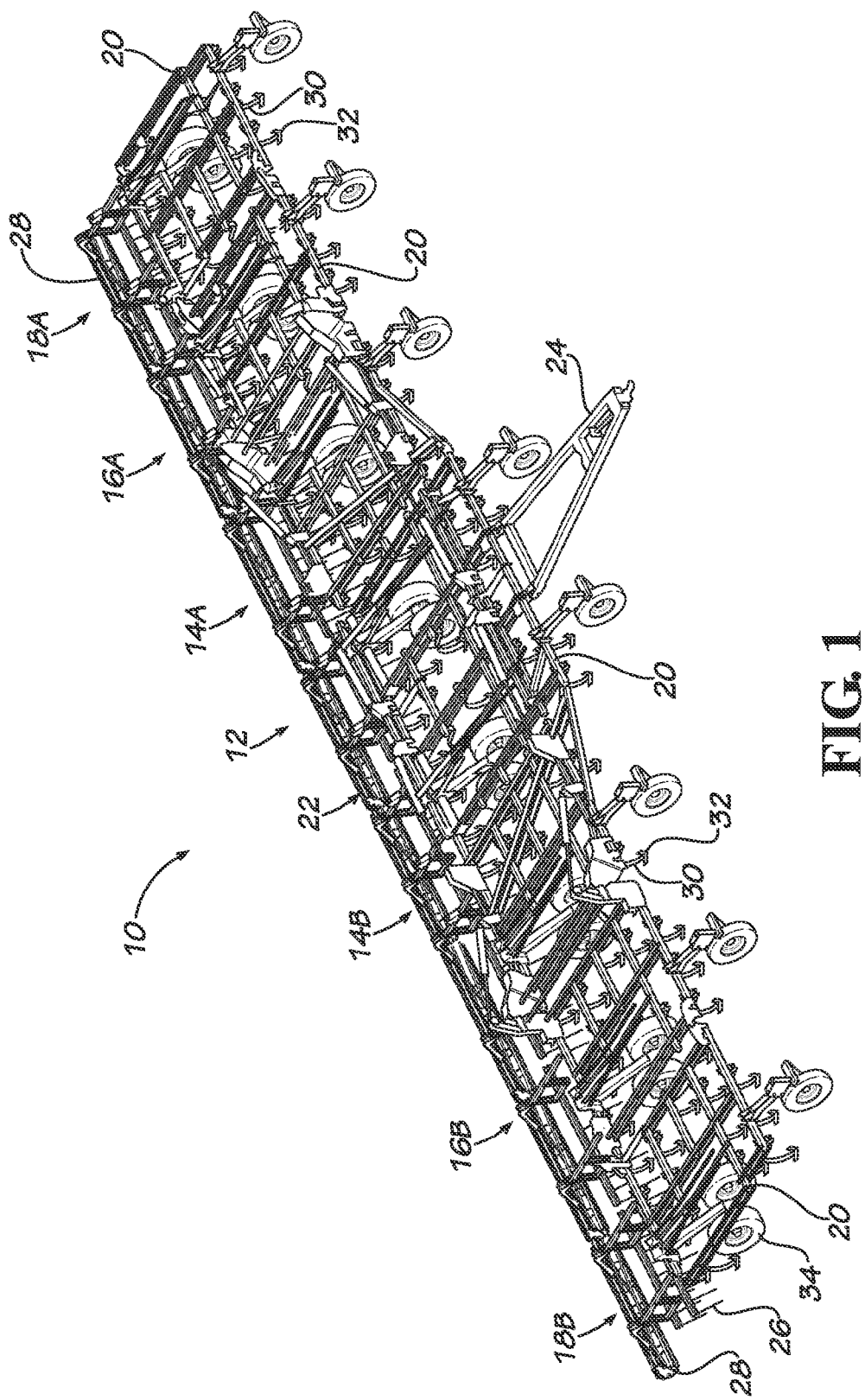
FIG. 1 is a top perspective view of an embodiment of an agricultural tillage implement of the present invention, in the form of a field cultivator, in an unfolded position.

Referring now to the drawings, and more particularly to FIG. 1, there is shown an embodiment of a tillage implement of the present invention. In the illustrated embodiment, the tillage implement is in the form of a field cultivator 10 for tilling and finishing soil prior to seeding.

Field cultivator 10 is configured as a multi-section field cultivator, and includes a center frame section 12 and a plurality of wing sections 14, 16 and 18. In the illustrated embodiment, field cultivator 10 has a triple-fold configuration with three left wings sections designated 14A, 16A and 18A, and three right wing sections designated 14B, 16B and 18B. Wing sections 14A and 14B are each inner wing sections, wing sections 16A and 16B are each middle wing sections, and wing sections 18A and 18B are each outer wing sections.

Center frame section 12 is the center section that is directly towed by a traction unit, such as an agricultural tractor (not shown). Center frame section 12 generally functions to carry a shank frame 20 for tilling the soil, and a rear auxiliary implement 22 for finishing the soil. A pull hitch 24 extends forward from shank frame 20 of center frame section 12, and is coupled with the traction unit in known manner.

Rear auxiliary implement 22 includes a spring tooth drag 26 and a rolling (aka, crumbler) basket 28 which coact with each other to finish the soil. However, rear auxiliary implement 22 can be differently configured, such as a spike tooth drag, cultivator shanks, etc.

Figure 2:
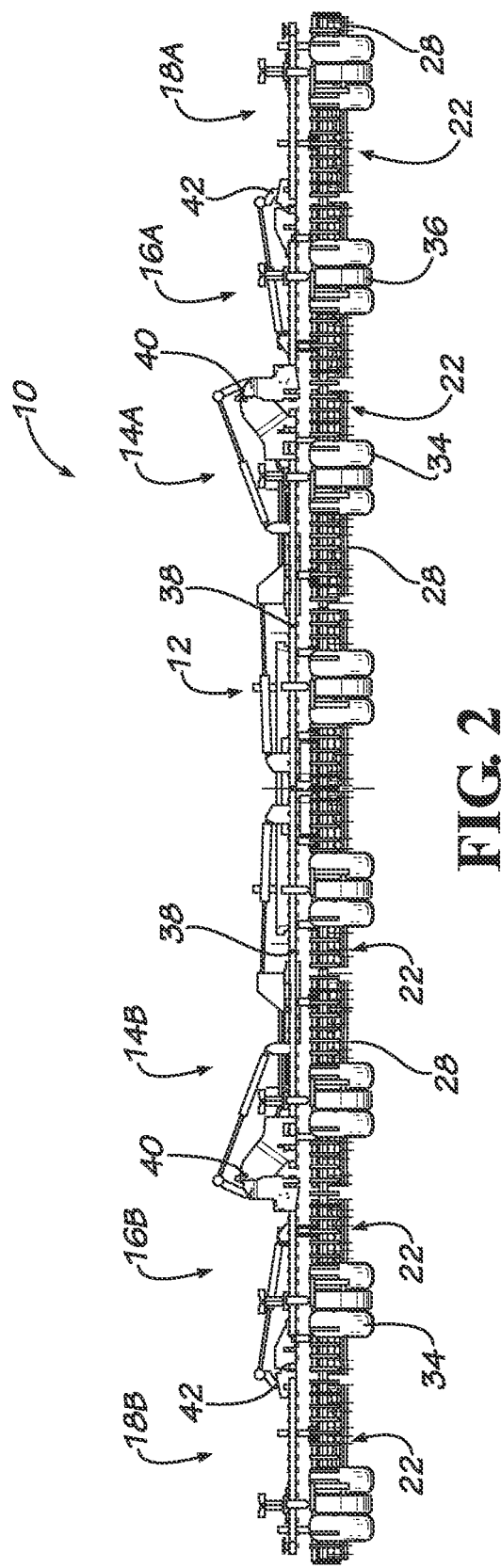
FIG. 2 is a front view of the field cultivator shown in FIG. 1.

Shank frame 20 generally functions to carry cultivator shanks 30 with shovels 32 at their lower ends for tilling the soil. Rear lift wheels 34 are used for raising and lowering the shank frame 20 with a hydraulic lift cylinder (not specifically visible in FIGS. 1 and 2), and a pair of front gauge wheels 36 are used to level the shank frame 20 during a field operation.

Similarly, each inner wing section 14A and 14B, middle wing section 16A and 16B, and outer wing section 18A and 18B includes a shank frame 20 for tilling the soil, a rear auxiliary implement 22 for finishing the soil, rear lift wheels 34 and front gauge wheels 36. These components are slightly different from but still similar to the like-named components described above with regard to center frame section 12, and are not described in further detail herein.

Figure 3:
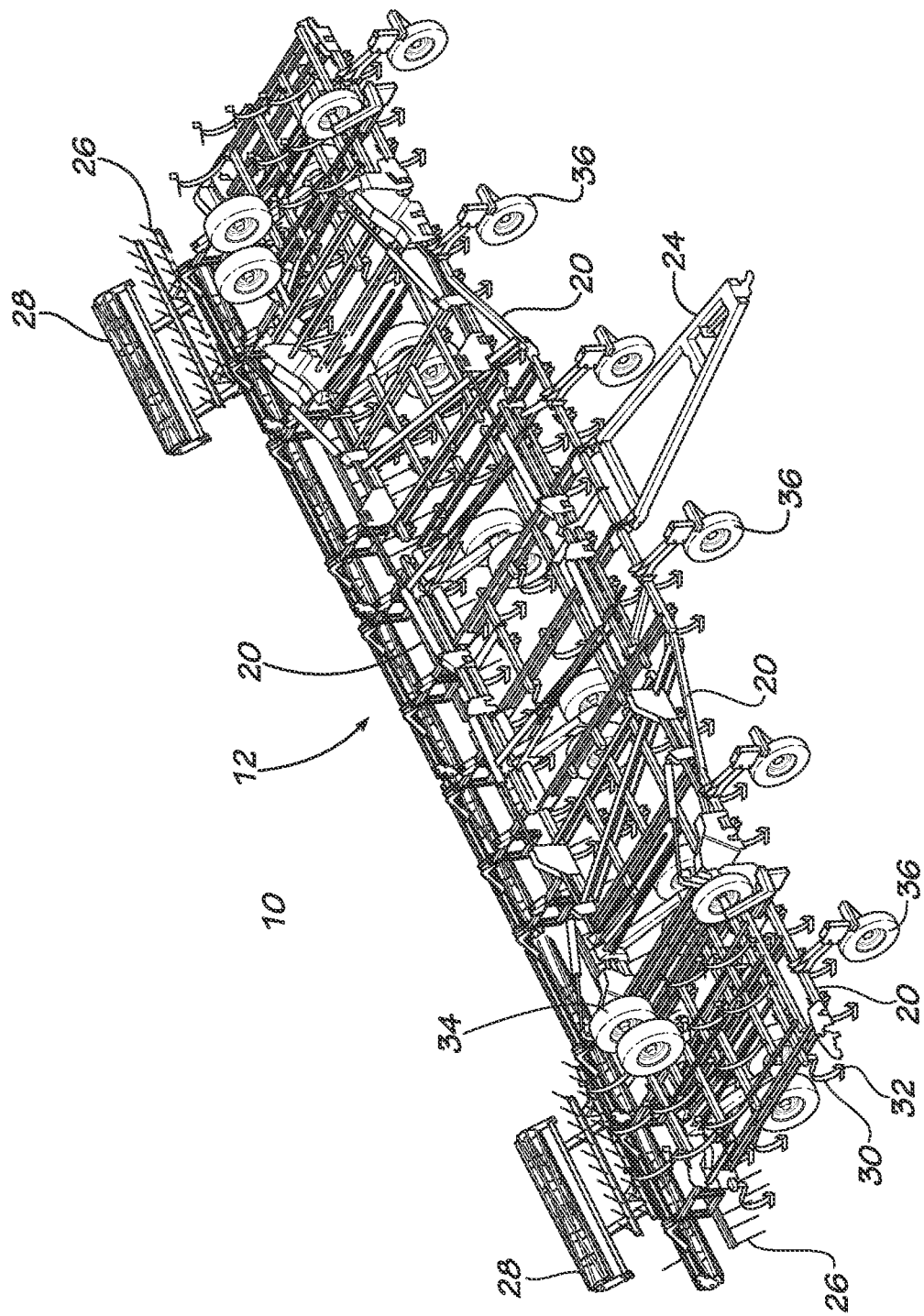
FIG. 3 is a top perspective view of the field cultivator shown in FIGS. 1-2, with the outer wing sections folded to a transport position.
Figure 4:
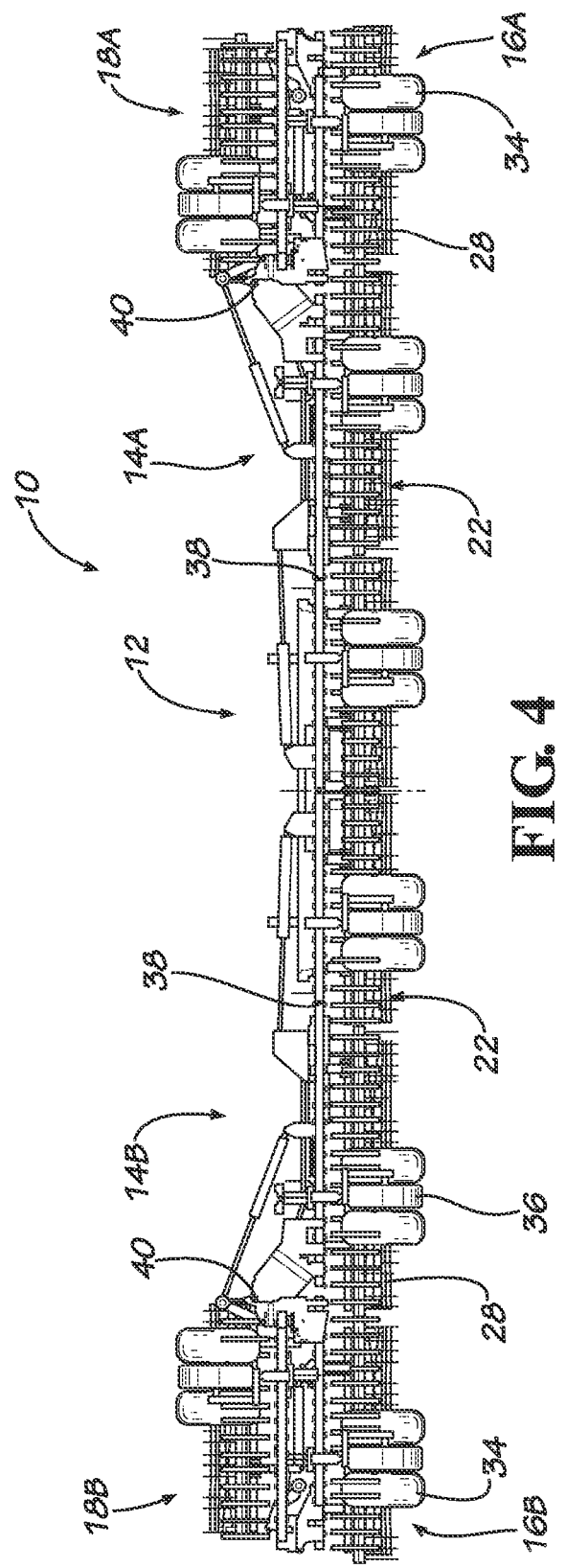
FIG. 4 is a front view of the field cultivator shown in FIG. 3, with the outer wing sections folded to the transport position.
Figure 5:
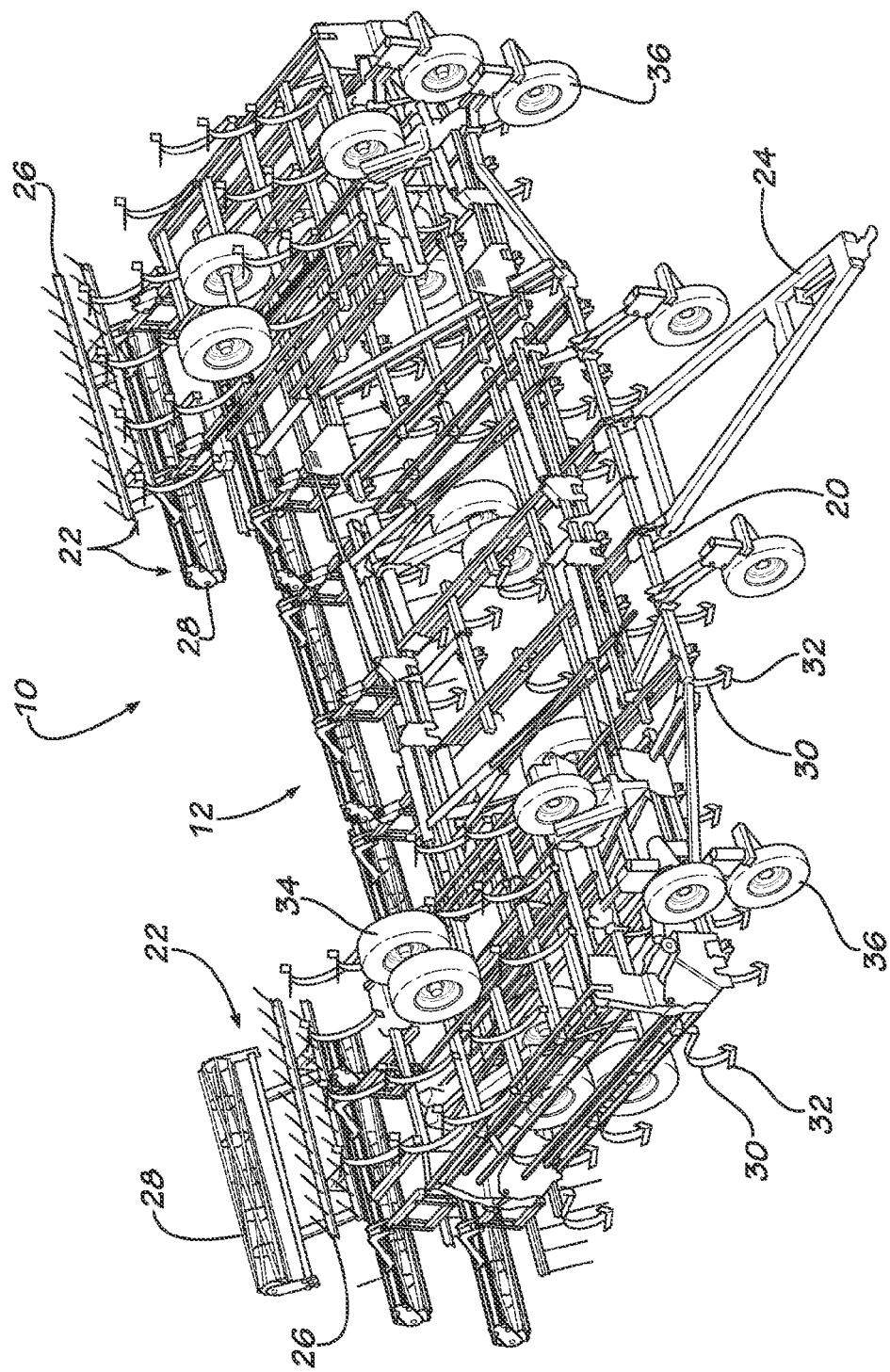
FIG. 5 is a top perspective view of the field cultivator shown in FIGS. 1-4, with the middle wing sections folded to a transport position.
Figure 6:
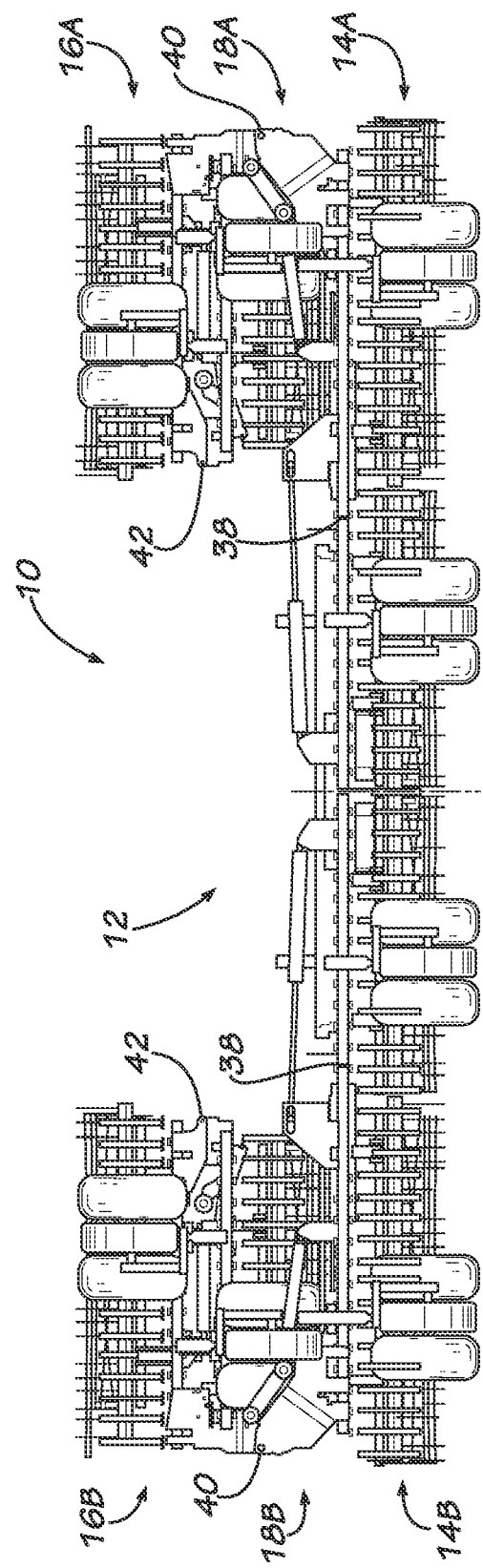
FIG. 6 is a front view of the field cultivator shown in FIG. 5, with the middle wing sections folded to the transport position.
Figure 7:
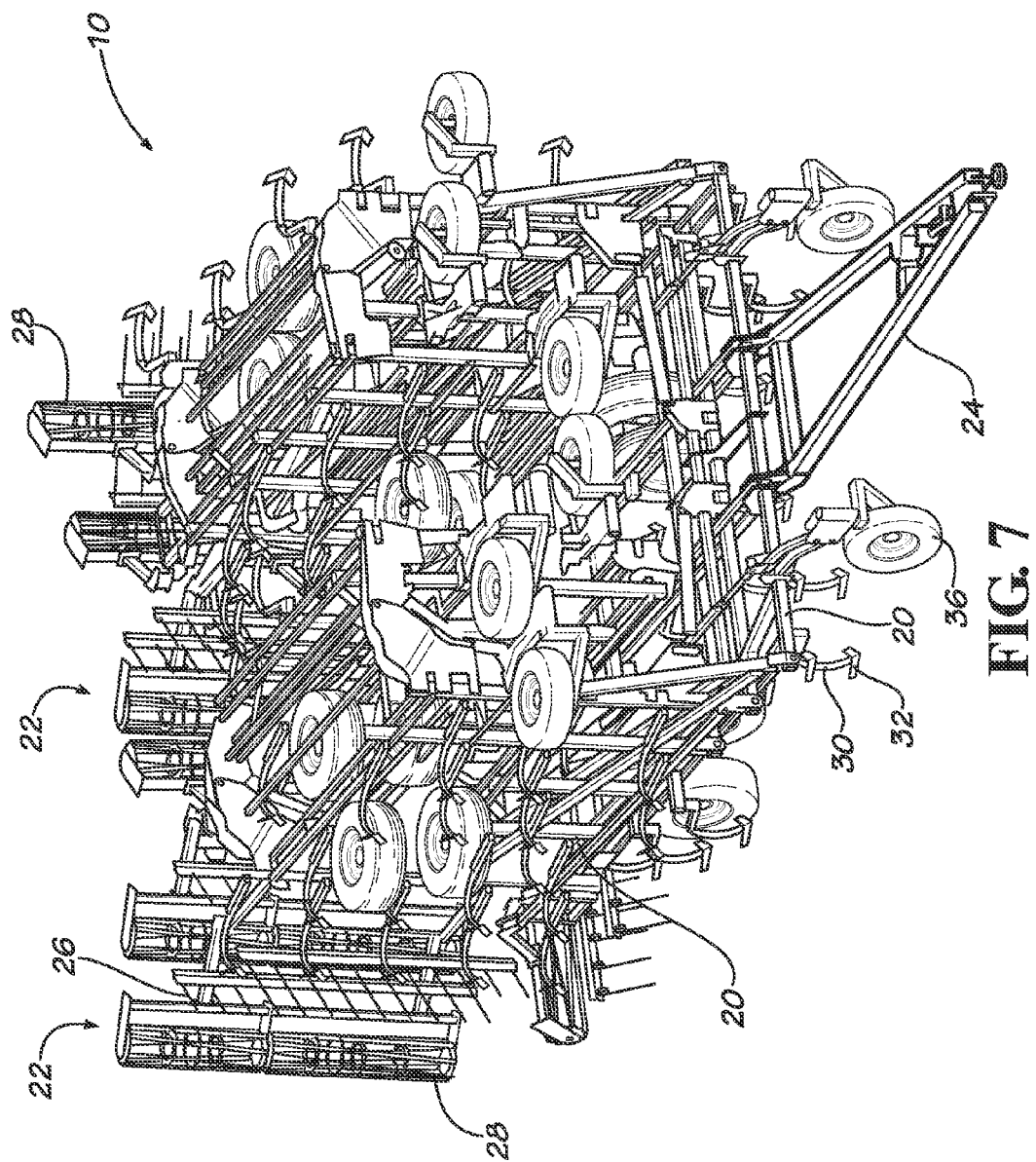
FIG. 7 is a top perspective view of the field cultivator shown in FIGS. 1-6, with the inner wing sections folded to a transport position.
Figure 8:
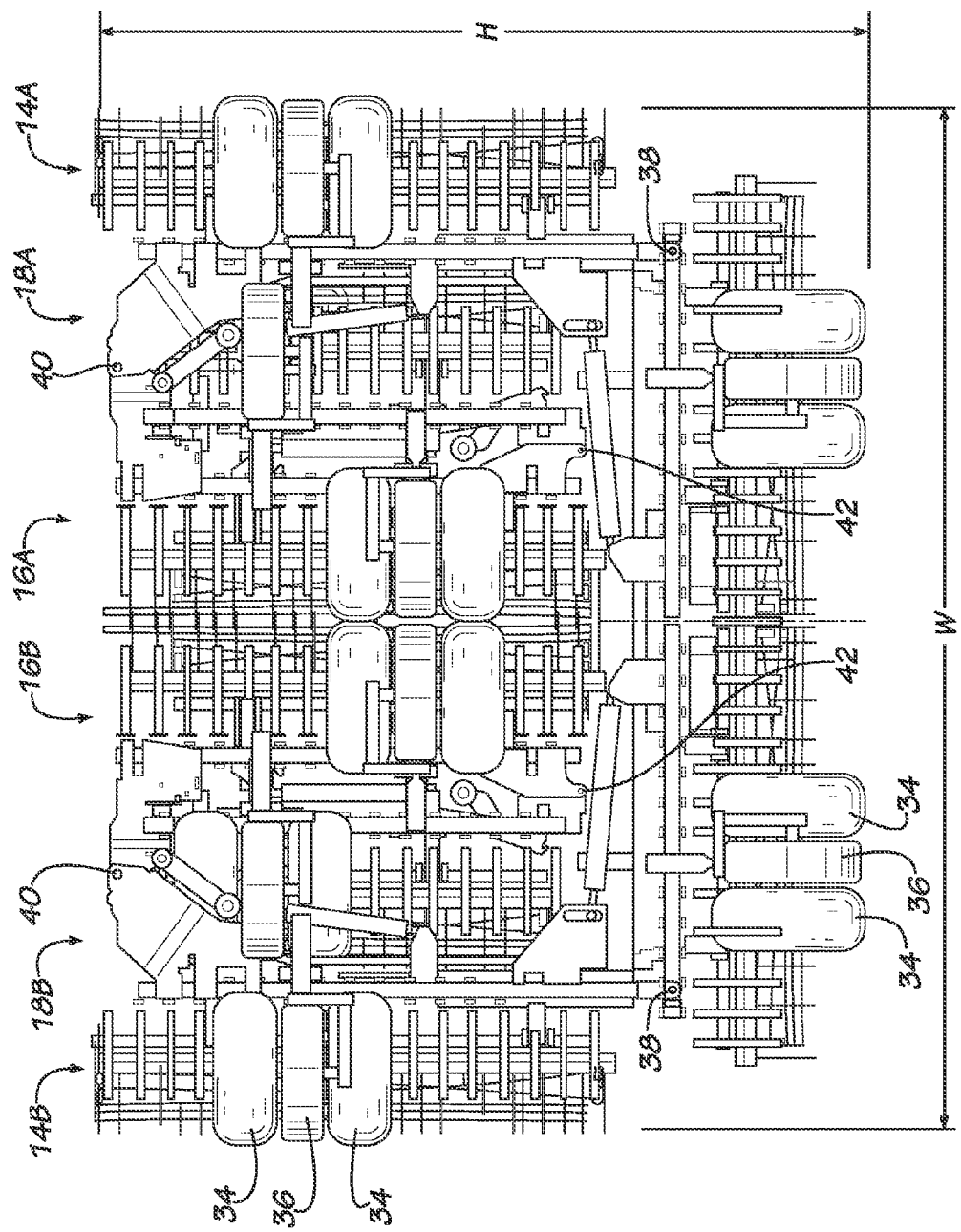
FIG. 8 is a front view of the field cultivator shown in FIG. 7, with the inner wing sections folded to the transport position.

During use, it is periodically necessary to move the field cultivator 10 from an unfolded (operating) position to a folded (transport) position. First, each outer wing section 18A and 18B is folded approximately 180° laterally inward and over a respective middle wing section 16A and 16B (FIGS. 3 and 4). With the outer wing sections 18A and 18B in the folded state, each middle wing section 16A and 16B is then folded approximately 180° laterally inward and over a respective inner wing section 14A and 14B (FIGS. 5 and 6). With the middle wing sections 16A and 16B in the folded state, each inner wing section 14A and 14B is then folded approximately 90° laterally inward and over the center frame section 12 (FIGS. 7 and 8). The outer wing sections 18, middle wing sections 16 and inner wing sections 14 thus stack together in a horizontally arranged stack over the center frame section 12 when in the folded state. When in the folded state, the outer wing sections 18 are sandwiched between a respective middle wing section 16 and inner wing section 14. To unfold the field cultivator 10 and transform back to the field or operating position shown in FIGS. 1 and 2, the folding sequence described above is simply reversed.

The outer wing sections 18, middle wing sections 16 and inner wing sections 14 are stacked together in a vertically arranged stack over the center frame section 12 when in the folded state (FIG. 8). To allow this type of nested stacking configuration, each of the wing sections 14, 16 and 18 have a pivot axis 38, 40 and 42 (FIG. 2), respectively, which is vertically offset to allow the wing sections to lie flat against the laterally inward shank frame 20/frame section 12 when in the folded state. The middle wing sections 16 have a pivot axis 40 that is vertically higher than pivot axes 38 and 42 of adjacent wing sections 14 and 18, when in the unfolded state.

Different countries and states have different regulatory highway requirements concerning oversized vehicles on the road. In the US, some states exempt agricultural equipment from such regulations, while others require that any type of vehicle on a road must comply with the oversized vehicle regulations. In Europe, the regulations may be more strict concerning the height and width of vehicles which may travel on a road without being accompanied by an escort vehicle. With the triple-fold field cultivator 10 of the present invention, the overall frontal profile dimensions when in the folded state fit within regulatory requirements for both the US and Europe. More particularly, with all of the wing sections 14, 16 and 18 in the folded state, the field cultivator 10 is then in a transport position with an overall frontal profile having dimensions with a maximum width "W" of no greater than approximately 20 feet, preferably approximately 18 feet wide, and a height "H" of no greater than approximately 14 feet, preferably approximately 13 feet, 6 inches high (FIG. 8).

These maximum frontal profile dimensions include all of the shank frames 20, shanks 30, rear lift wheels 34 and front gauge wheels 36, when in the folded state. The rear auxiliary implements 22 are considered to be add-ons to the main field cultivator 10, and may be outside these overall frontal profile dimensions, at least if not folded upwardly for the transport position. However, it is the intention that all of field cultivator 10, including the rear auxiliary implements 22, be within these maximum frontal profile dimensions when in the transport position.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
   a center frame section including a pull hitch configured to be towed; and
   a plurality of wing sections positioned on opposite lateral sides of the center frame section, said plurality of wing sections defining a triple-fold configuration and including an inner wing section, a middle wing section and an outer wing section, each said outer wing section being configured to fold laterally inward and over a respective said middle wing section such that each said outer wing section lies in a plane generally parallel to the respective said middle wing section, each said middle wing section being configured to fold laterally inward and over a respective said inner wing section such that each middle wing section and a respective outer wing section lie in corresponding planes generally parallel to and over the respective said inner wing section, and each said inner wing section being configured to fold laterally inward and over said center frame section, whereby each of said plurality of wing sections when in a folded state are in a transport position with an overall frontal profile having dimensions of no greater than approximately 20 feet wide by 14 feet high.

2. The agricultural tillage implement of claim 1, wherein each of said plurality of wing sections when in a folded state are in a transport position with an overall frontal profile having dimensions of no greater than approximately 18 feet wide by 13 feet, 6 inches high.

3. The agricultural tillage implement of claim 1, whereby each of said inner wing sections, said middle wing sections and an outer wing sections are positioned above said center frame section when in a folded state.

4. The agricultural tillage implement of claim 1, wherein each of the plurality of wing sections includes a shank frame, a plurality of shanks extending downwardly from a respective said shank frame when in an unfolded state, and at least one wheel associated with each said shank frame, and wherein the overall frontal profile dimensions are based on overall outside dimensions of all of said shank frames, all of said plurality of shanks and all of said wheels, when in the folded state.

5. The agricultural tillage implement of claim 1, wherein each of said plurality of wing sections has a vertically offset pivot axis allowing said outer wing sections, said middle wing sections and an inner wing sections to stack together in a vertically arranged stack over the center frame section when in the folded state.

6. The agricultural tillage implement of claim 1, further including a plurality of rear auxiliary tillage implements, each said rear auxiliary tillage implement being positioned behind said center frame section or one of said plurality of wing sections.

7. The agricultural tillage implement of claim 6, wherein each said rear auxiliary tillage implement includes a rolling basket.

8. The agricultural tillage implement of claim 1, wherein said agricultural tillage implement is a field cultivator.

9. A method of folding a multi-section field cultivator from an operating position to a transport position, the field cultivator including a center frame section having a pull hitch and a plurality of wing sections defining a triple-fold configuration positioned on opposite lateral sides of the center frame section, said method comprising the steps of:
providing the plurality of wing sections with an inner wing section, a middle wing section and an outer wing section,
folding each said outer wing section laterally inward and over a respective said middle wing section such that each said outer wing section lies in a plane generally parallel to the respective said middle wing section;
folding each said middle wing section laterally inward and over a respective said inner wing section such that each middle wing section and a respective outer wing section lie in corresponding planes generally parallel to and over the respective said inner wing section, and
folding each said inner wing section laterally inward and over said center frame section, whereby each of said plurality of wing sections when in a folded state are in a transport position with an overall frontal profile having dimensions of no greater than approximately 20 feet wide by 14 feet high.

10. The method of folding a multi-section field cultivator of claim 9, wherein each of said plurality of wing sections when in a folded state are in a transport position with an overall frontal profile having dimensions of no greater than approximately 18 feet wide by 13 feet, 6 inches high.

11. The method of folding a multi-section field cultivator of claim 9, whereby each of said inner wing sections, said middle wing sections and an outer wing sections are positioned above said center frame section when in a folded state.

12. The method of folding a multi-section field cultivator of claim 9, wherein each of the plurality of wing sections includes a frame section, a plurality of shanks extending downwardly from a respective said frame section when in an unfolded state, and at least one wheel associated with each said frame section, and wherein the overall frontal profile dimensions are based on overall outside dimensions of all of said frame sections, all of said plurality of shanks and all of said wheels, when in the folded state.

13. The method of folding a multi-section field cultivator of claim 9, wherein each of said plurality of wing sections has a vertically offset pivot axis allowing said outer wing sections, said middle wing sections and an inner wing sections to stack together in a vertically arranged stack over the center frame section when in the folded state.

14. The method of folding a multi-section field cultivator of claim 9, further including a plurality of rear auxiliary tillage implements, each said rear auxiliary tillage implement being positioned behind said center frame section or one of said plurality of wing sections.

15. The method of folding a multi-section field cultivator of claim 14, wherein each said rear auxiliary tillage implement includes a rolling basket.

16. An agricultural tillage implement, comprising:
a center frame section including a pull hitch configured to be towed; and
a plurality of wing sections positioned on opposite lateral sides of the center frame section, said plurality of ing sections defining a triple-fold configuration and including an inner wing section, a middle wing section and an outer wing section, each said outer wing section being configured to fold laterally inward and over a respective said middle wing section, each said middle wing section being configured to fold laterally inward and over a respective said inner wing section, and each said inner wing section being configured to fold laterally inward and over said center frame section, whereby each of said plurality of wing sections when in a folded state are in a transport position with an overall frontal profile having dimensions of no greater than approximately 20 feet wide by 14 feet high;
wherein:
each of said plurality of wing sections has a vertically offset pivot axis allowing said outer wing sections, said middle wing sections and an inner wing sections to stack together in a vertically arranged stack over the center frame section when in the folded state; and
each said middle wing section has a pivot axis that is vertically higher than a pivot axis of an adjacent said outer wing section or inner wing section, when in an unfolded state.

17. A method of folding a multi-section field cultivator from an operating position to a transport position, the field cultivator including a center frame section having a pull hitch and a plurality of wing sections defining a triple-fold configuration positioned on opposite lateral sides of the center frame section, said method comprising the steps of:

providing the plurality of wing sections with an inner wing section, a middle wing section and an outer wing section, folding each said outer wing section laterally inward and over a respective said middle wing section;

folding each said middle wing section laterally inward and over a respective said inner wing section, and folding each said inner wing section laterally inward and over said center frame section, whereby each of said plurality of wing sections when in a folded state are in a transport position with an overall frontal profile having dimensions of no greater than approximately 20 feet wide by 14 feet high;

wherein:

each of said plurality of wing sections has a vertically offset pivot axis allowing said outer wing sections, said middle wing sections and an inner wing sections to stack together in a vertically arranged stack over the center frame section when in the folded state; and each said middle wing section has a pivot axis that is vertically higher than a pivot axis of an adjacent said outer wing section or inner wing section, when in an unfolded state.

18. An agricultural tillage implement, comprising:

a center frame section including a pull hitch configured to be towed; and a plurality of wing sections positioned on opposite lateral sides of the center frame section, said plurality of wing sections including an inner wing section, a middle wing section and an outer wing section, each said outer wing section being configured to fold laterally inward and over a respective said middle wing section, each said middle wing section being configured to fold laterally inward and over a respective said inner wing section, and each said inner wing section being configured to fold laterally inward and over said center frame section, whereby each of said plurality of wing sections when in a folded state are in a transport position with an overall frontal profile having dimensions of no greater than approximately 20 feet wide by 14 feet high;

wherein each of said plurality of wing sections has a vertically offset pivot axis allowing said outer wing sections, said middle wing sections and an inner wing sections to stack together in a vertically arranged stack over the center frame section when in the folded state; and wherein each said middle wing section has a pivot axis that is vertically higher than a pivot axis of an adjacent said outer wing section or inner wing section, when in an unfolded state.

* * * * *